US007165081B2

(12) United States Patent
Chen

(10) Patent No.: US 7,165,081 B2
(45) Date of Patent: Jan. 16, 2007

(54) STORAGE SERVER EMBEDDED CODE BACKUP METHOD AND SYSTEM

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 478 days.

(21) Appl. No.: 10/618,944

(22) Filed: Jul. 11, 2003

(65) Prior Publication Data

US 2005/0010617 A1    Jan. 13, 2005

(51) Int. Cl.
*G06F 17/30* (2006.01)
(52) U.S. Cl. .......................................... 707/203; 707/1
(58) Field of Classification Search ........ 707/200–205, 707/1–10, 100–104.1; 711/114
See application file for complete search history.

(56) References Cited

U.S. PATENT DOCUMENTS 5,822,581 A * 10/1998 Christeson ...................... 713/1
6,459,624 B1 * 10/2002 Kuo ........................ 365/185.33
6,754,767 B1 * 6/2004 Gold ........................... 711/114

2002/0099974 A1 * 7/2002 Lin ............................. 714/13

FOREIGN PATENT DOCUMENTS

JP              09330272 A   * 12/1997

* cited by examiner

*Primary Examiner*—Mohammad Ali
(74) *Attorney, Agent, or Firm*—Fulbright & Jaworski L.L.P.

(57) ABSTRACT

A storage server embedded code backup method and system is provided, which is designed for use with a storage server for backup of the storage server's embedded code stored in a system memory module, so that in the event of the embedded code being corrupted, it can provide a backup recovery to the corrupted code to allow the storage server to resume normal operation. The proposed method and system is characterized by that the storage space of the storage server's inherent mass storage unit, such as RAID unit, is utilized to be partitioned into a backup region for storage of a duplicated copy of the storage server's embedded code for backup recovery when the storage server's embedded code is corrupted. Since RAID unit is an inherent device of storage server, no additional hardware is required for the implementation of the proposed method and system, which represents a cost effective backup-and-recovery solution to the storage server.

5 Claims, 2 Drawing Sheets

STORAGE SERVER EMBEDDED CODE BACKUP METHOD AND SYSTEM

BACKGROUND OF THE INVENTION

1. Field of the Invention

This invention relates to information technology, and more particularly, to a storage server embedded code backup method and system, which is designed for use with a storage server in a network system for backup of the storage server's embedded code, including the storage server's operating system and applications so that in the event of the embedded code being corrupted, it can provide a backup recovery to the corrupted code to allow the storage server to resume normal operation.

2. Description of Related Art

Storage server is a network-linked computer platform which is commonly used in large business entities to provide users with a network-accessible data storage means for the users to store their data via network to the storage server. A storage server is typically equipped with a mass storage unit having a very large storage capacity, such as a RAID (Redundant Array of Independent Disks) unit, which allows users to gain access via network to the storage server's RAID unit for storage and retrieval of large volumes of data.

To help increase performance, storage server typically utilizes a nonvolatile programmable memory, such as flash memory, to hold the computer code of its operating system and applications. For this reason, the computer code of the storage server's operating system and applications is customarily referred to as "embedded code". The use of embedded code can help significantly increase the performance of the storage server since access to memory is faster than access to hard disks. Presently, the total amount of embedded code in a storage server, including the storage server's operating system and applications, is about 8 MB to 16 MB (megabyte). Therefore, if redundancy is to be provided to the embedded code, a conventional solution is to install an additional 8 MB to 16 MB memory module to the storage server to hold a duplicated copy of the embedded code. However, since nonvolatile programmable memory such as flash memory is typically quite expensive, it would be undoubtedly quite cost-ineffective to use additional memory modules to provide redundant backup capability to the storage server. For this sake, small company's storage server is typically installed with only a single copy of operating system and applications in the storage server's system memory, and no redundant backup facility is provided. Therefore, once the embedded code in the storage server is corrupted, it would cause the storage server to halt its data service, which may cause even greater loss to the company.

SUMMARY OF THE INVENTION

It is therefore an objective of this invention to provide a storage server embedded code backup method and system which is capable of providing a backup-and-recovery capability to a storage server without having to install additional expensive memory modules to the storage server.

It is another objective of this invention to provide a storage server embedded code backup method and system that serves as a cost effective backup-and-recovery solution to a storage server.

The storage server embedded code backup method and system according to the invention is designed for use with a storage server having a system memory module and a mass storage module, with the memory module being used to store a set of embedded code such as embedded operating system and application, for backup of the embedded code in the memory module in the storage server, so that in the event of the embedded code being corrupted, it can provide a backup recovery to the corrupted code to allow the storage server to resume normal operation.

The storage server embedded code backup method and system according to the invention is characterized by that the storage space of the storage server's inherent mass storage unit, such as RAID unit, is utilized to be partitioned into a backup region for storage of a duplicated copy of the storage server's embedded code for backup recovery when the storage server's embedded code is corrupted. Since RAID unit is an inherent device of storage server, no additional hardware is required for the implementation of the proposed method and system, which represents a cost effective backup-and-recovery solution to the storage server.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The storage server embedded code backup method and system according to the invention is disclosed in full details by way of preferred embodiments in the following with reference to the accompanying drawings.

Figure 1:
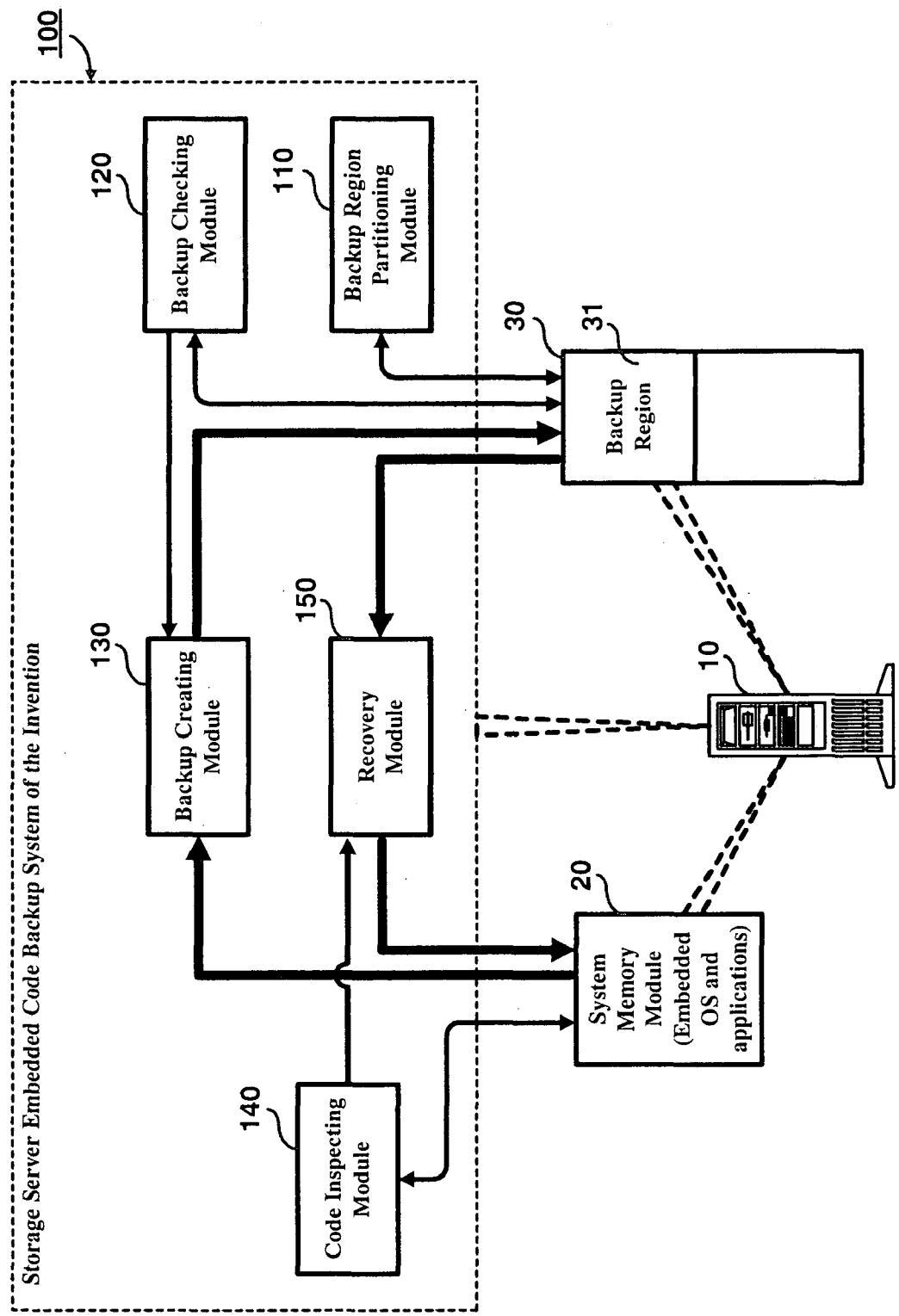
FIG. 1 is a schematic diagram showing an object-oriented component model of the storage server embedded code backup system according to the invention.

FIG. 1 is a schematic diagram showing the object-oriented component model of the storage server embedded code backup system (as the part enclosed in the dotted box indicated by the reference numeral 100). As shown, in application, the storage server embedded code backup system of the invention 100 is integrated to a network-linked storage server 10 having a nonvolatile programmable system memory module 20 and a mass storage module 30, wherein the system memory module 20 is used to store the computer code of a server-specific operating system and one or more server-specific applications, while the mass storage module 30 is, for example, a RAID (Redundant Array of Independent Disks) unit, which has a very large data storage capacity for holding a large amount of data that can be accessed by users via a network system (not shown) linked to the storage server 10.

The storage server embedded code backup system of the invention 100 is capable of making a backup copy of the embedded code in the storage server's system memory module 20, so that in the event of the embedded code being corrupted, the backup copy can be used to restore the corrupted code to allow the storage server 10 to resume normal operation.

In practice, the storage server embedded code backup system of the invention 100 can be implemented via software, whose object-oriented component model comprises: (a) a backup region partitioning module 110; (b) a backup checking module 120; (c) a backup creating module 130; (d) a code inspecting module 140; and (e) a recovery module 150.

The backup region partitioning module 110 allows the user to perform a user-operated session to partition a backup region 31 from the storage space of the storage server's mass storage module 30 for use to store a backup copy of all the embedded code in the system memory module 20. This backup region 31 is reserved to be used solely for storing a backup copy of the embedded code in the system memory module 20, and cannot be used to store any other kinds of code or data.

The backup checking module 120 is capable of being activated at the boot of the storage server 10 to check whether the backup region 31 in the storage space of the storage server's mass storage module 31 stores a backup copy of the embedded code currently stored in the storage server's system memory module 20. If NOT, the backup checking module 120 issues a backup enable message to the backup creating module 130.

The backup creating module 130 is capable of being activated in response to the backup enable message from the backup checking module 120 to create a duplicated copy of all the embedded code in the system memory module 20, including operating system and applications, and store the duplicated copy as a backup file into the backup region 31 in the storage server's mass storage module 30.

The code inspecting module 140 is capable of being activated at the boot and during operation of the storage server 10 to inspect whether the embedded code in the storage server's system memory module 20 is corrupted. If YES, the code inspecting module 140 promptly issues a recovery enable message to the recovery module 150.

The recovery module 150 is capable of being activated in response to the recovery enable message from the code inspecting module 140 to move the backup file stored in the backup region 31 in the storage space of the storage server's mass storage module 30 back to the system memory module 20 to thereby restore the corrupted embedded code in the system memory module 20.

Figure 2:
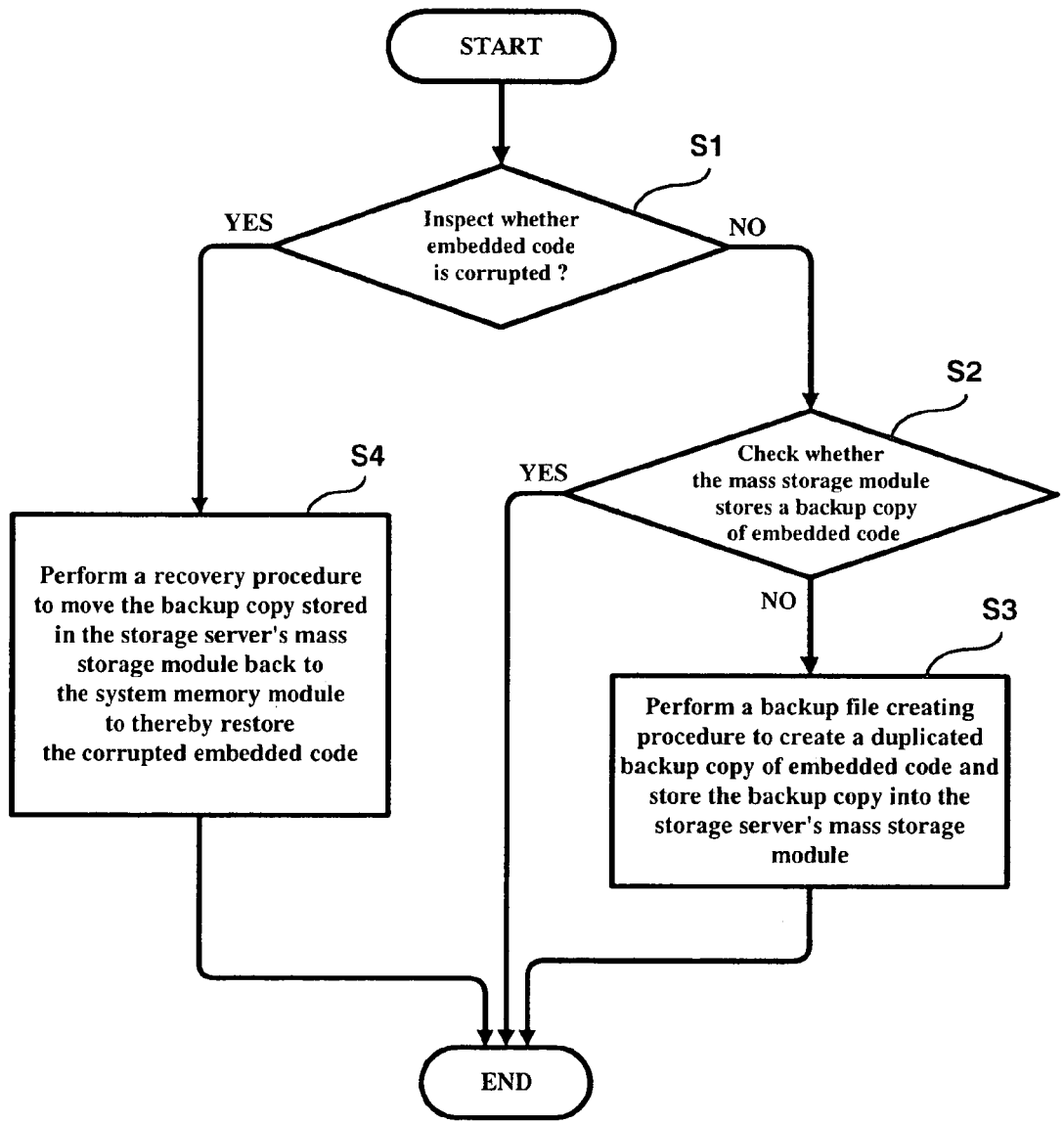
FIG. 2 is a flow diagram showing the method steps performed by the storage server embedded code backup system according to the invention.

FIG. 2 is a flow diagram showing the method steps performed by the storage server embedded code backup system of the invention 100. In practice, the storage server embedded code backup system of the invention 100 can be implemented via software and integrated to the operating system of the storage server 10. After initially installed to the storage server 10, it first requires the user to use the backup region partitioning module 110 to partition a backup region 31 from the storage space of the storage server's mass storage module 30. After that, the procedural steps shown in FIG. 2 will be automatically executed at the boot and during operation of the storage server 10 repeatedly.

Referring to FIG. 2 together with FIG. 1, the first step S1 is to perform a code inspecting procedure, wherein the code inspecting module 140 is activated to inspect whether any portion of the embedded code stored in the system memory module 20, including operating system and all applications, is corrupted. IF NOT, the procedure then goes to the step S2; whereas if YES, the procedure goes to the step S4.

The step S2 is to perform a backup checking procedure, wherein the backup checking module 120 is activated to check whether the backup region 31 in the storage space of the storage server's mass storage module 31 stores a backup copy of the embedded code in the system memory module 20. If YES, the procedure is ended; whereas if NO, the procedure goes to the step S3.

The step S3 is to perform a backup creating procedure, wherein the backup creating module 130 is activated to create a duplicated copy of all the embedded code in the system memory module 20, including operating system and applications, and store the duplicated copy as a backup file into the backup region 31 in the storage server's mass storage module 30. After this, the procedure is ended.

The step S4 is executed to perform a recovery procedure when the step S1 checks that the embedded code in the system memory module 20 is corrupted, wherein the recovery module 150 is activated to move the backup file stored in the backup region 31 in the storage server's mass storage module 30 back to the system memory module 20 to thereby restore the corrupted embedded code in the system memory module 20 so as to resume the normal operation of the storage server 10. The procedure is then ended.

In conclusion, the invention provides a storage server embedded code backup method and system which is designed for use with a storage server in a network system for backup of the storage server's embedded code so that in the event of the embedded code being corrupted, it can provide a backup recovery to the corrupted code to allow the storage server to resume normal operation. The storage server embedded code backup method and system according to the invention is characterized by that the storage space of the storage server's inherent mass storage unit, such as RAID unit, is utilized to be partitioned into a backup region for storage of a duplicated copy of the storage server's embedded code for backup recovery when the storage server's embedded code is corrupted. Since RAID unit is an inherent device of storage server, no additional hardware is required for the implementation of the proposed method and system, which represents a cost effective backup-and-recovery solution to the storage server.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A storage server embedded code backup system for use with a storage server having a nonvolatile programmable system memory module and a mass storage module, with the memory module being used to store a set of embedded code, for the purpose of providing a backup and recovery capability to the embedded code;

the storage server embedded code backup system comprising:

a backup region partitioning module, which allows a user-operated session to partition a backup region from the storage space of the storage server's mass storage module;

a backup checking module, which is capable of checking whether the backup region in the storage space of the storage server's mass storage module stores a backup copy of the embedded code in the storage server's system memory module;

a backup creating module, which is capable of creating a duplicated backup copy of the embedded code in the storage server's system memory module and storing the backup copy into the backup region in the storage server's mass storage module, wherein the backup region is reserved to be used solely for storing a backup copy of the embedded code;

a code inspecting module, which is capable of being activated at the boot and during operation of the storage server to inspect whether the embedded code in the system memory module is corrupted, and if yes, generating a recovery enable message; and a recovery module, which is capable of being activated in response to the recovery enable message from the code inspecting module to move the backup copy stored in the backup region in the storage server's mass storage module back to the system memory module to thereby restore the corrupted embedded code in the system memory module.

2. The storage server embedded code backup system of claim 1, wherein the storage server's mass storage module is a RAID unit.

3. The storage server embedded code backup system of claim 1, wherein the embedded code stored in the storage server's system memory module includes a server-specific operating system and at least one server-specific application.

4. A storage server embedded code backup system for use with a storage server having a nonvolatile programmable system memory module and a mass storage module, with the memory module being used to store a set of embedded code including a server-specific operating system and at least one server-specific application, for the purpose of providing a backup and recovery capability to the embedded operating system and application;

the storage server embedded code backup system comprising:

a backup region partitioning module, which allows a user-operated session to partition a backup region from the storage space of the storage server's mass storage module;

a backup checking module, which is capable of checking whether the backup region in the storage space of the storage server's mass storage module stores a backup copy of the embedded operating system and application in the storage server's system memory module;

a backup creating module, which is capable of creating a duplicated backup copy of the embedded operating system and application in the storage server's system memory module and storing the backup copy into the backup region in the storage server's mass storage module, wherein the backup region is reserved to be used solely for storing the backup copy of the embedded operating system and application;

a code inspecting module, which is capable of being activated at the boot and during operation of the storage server to inspect whether the embedded operating system and application in the system memory module is corrupted, and if yes, generating a recovery enable message; and a recovery module, which is capable of being activated in response to the recovery enable message from the code inspecting module to move the backup copy stored in the backup region in the storage server's mass storage module back to the system memory module to thereby restore the corrupted embedded operating system and application in the system memory module.

5. The storage server embedded code backup system of claim 4, wherein the storage server's mass storage module is a RAID unit.

* * * * *